Alfred L. Miller
Samuel B. Robison
Francis P. Baldwin
Kenneth W. Powers

Inventors

By W. H. Angers  Attorney

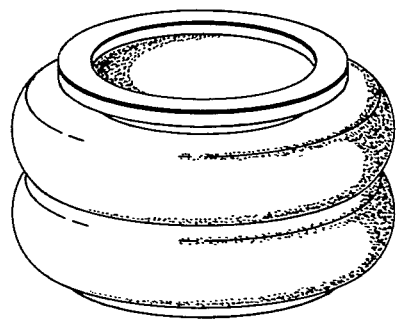
FIG.-2
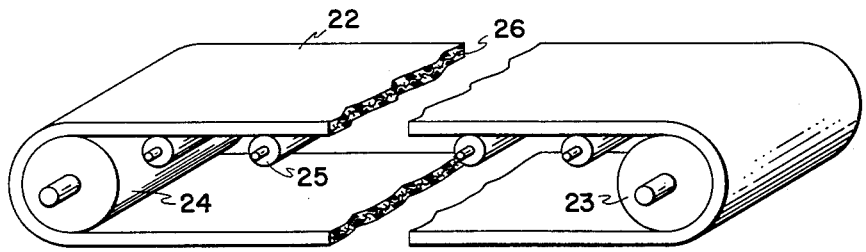
FIG.-3
FIG.-4
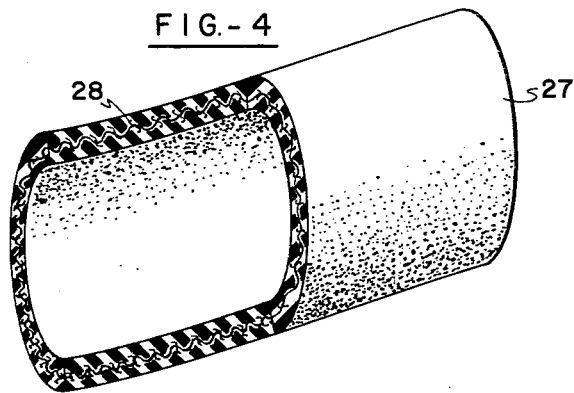
Alfred L. Miller
Samuel B. Robison
Francis P. Baldwin
Kenneth W. Powers
Inventors
By *H. H. Smyers* Attorney 3,039,906
LAMINATED STRUCTURES
Francis P. Baldwin, Colonia, Samuel B. Robison, Roselle, Alfred L. Miller, Cranford, and Kenneth W. Powers, Metuchen, N.J., assignors to Esso Research and Engineering Company, a corporation of Delaware
Filed May 3, 1957, Ser. No. 656,959
19 Claims. (Cl. 154—52)

This invention relates to coating compositions for natural or synthetic fibrous materials, such as cotton, rayon, nylon, etc., to improve the adhesion thereof to rubber such as natural rubber or especially synthetic rubber such as GR-S rubber, Buna-N rubber, and preferably butyl rubber.

More particularly the present invention relates to coating fibers, filaments, or especially tire cords with a first layer of a phenolic-aldehyde resin-containing natural rubber latex, drying and then coating with a second layer of a brominated butyl rubber cement, drying and then incorporating the thus treated fibers, filaments or cords into a rubber matrix to form a composite such as the carcass plies in tires.

The invention will be best understood from the following description when read in connection with the accompanying drawings in which:

FIGURE 2 is a view in side elevation of an air spring suitable for use in passenger cars or buses and manufactured in accordance with the present invention;

FIGURE 3 is a generally edgewise prospective view of a conveyor belt structure produced in accordance with the present invention; and FIGURE 4 is a perspective view, partly in section, of a portion of a typical hose produced in accordance with the present invention.

Figure 1:
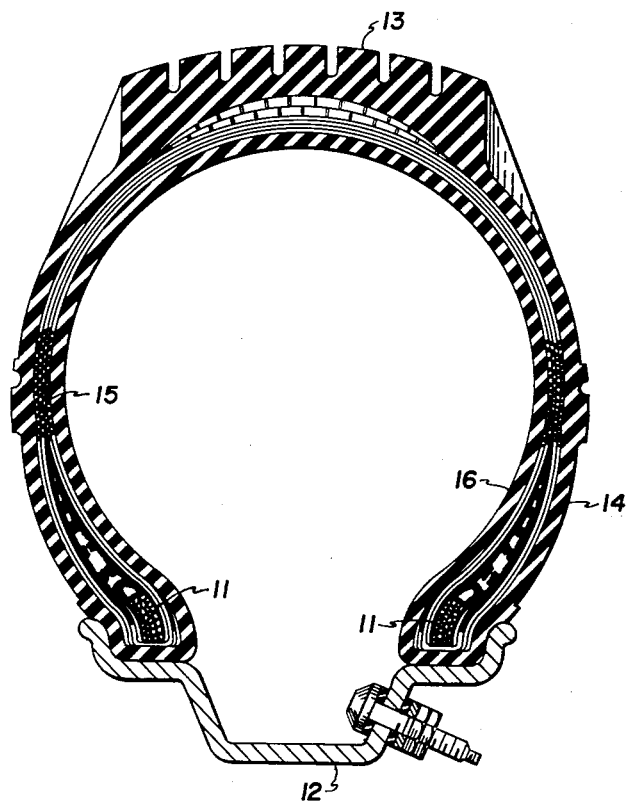
FIGURE 1 is a vertical section of a pneumatic tubeless tire manufactured in accordance with the present invention.

Heretofore, cellulosic and synthetic fibers such as rayon, regenerated cellulose and nylon threads, cords, or filaments have adhered very poorly to rubber and to compounded rubber stocks (especially containing butyl rubber) when they were united and the rubber stock subsequently cured according to any known process of producing adhesion between rubber and fibers. This poor adhesion, especially of synthetic threads, cords, and fabrics to synthetic rubber such as butyl rubber has constituted a very serious obstacle to more extensive use of butyl rubber in the manufacture of automobile tires, reinforced rubber belts and similar products consisting of alternate plies of rubber and cords. Such products are required to adhere very strongly for long periods of time under drastic conditions of high temperature, constant flexing, bending, shock, etc. For example, if nylon cord is pressed into butyl rubber or a butyl rubber stock and the composite vulcanized, it will be observed that the nylon cord may be pulled away from the rubber with comparative facility.

Butyl rubber comprises a copolymer containing about 85 to 99.5%, preferably 95 to 99.5% of a $C_4$ to $C_8$ isoolefin such as isobutylene, the remainder being a $C_4$ to $C_{10}$ multiolefin, preferably a $C_4$ to $C_6$ conjugated diolefin such as butadiene, dimethyl butadiene, piperylene or especially isoprene. The preparation of butyl-type rubbers is described in U.S. Patent 2,356,128 to Thomas et al. and also in other patents as well as in literature. In the appended claims the expression "butyl rubber" has this meaning.

According to the present invention, fibrous materials such as tire cords are coated with a phenolic-aldehyde resin-containing natural rubber latex having about 1 to 25 weight percent and preferably about 5 to 20 weight percent natural rubber latex solids, about 0.1 to 5.0 weight percent, preferably about 0.4 to 3.0 weight percent of the phenolic material, preferably resorcinol, about 0.2 to 3.0 weight percent, preferably about 0.3 to 1.5 weight percent of the aldehyde, preferably formaldehyde, and about 70 to 95 weight percent, preferably about 75 to 90 weight percent water. Before coating, the phenolic-aldehyde resin-containing natural rubber latex is advantageously adjusted to a pH of between about 7 and 13, preferably about 8 to 11 and aged at about 40° to 150° F., preferably at about 50° to 100° F., for a time, depending upon the temperature, of about 20 minutes to 30 hours, preferably about 1 to 20 hours and the fibrous materials coated with the thus aged latex. The latex-coated fibrous materials are then dried, preferably with slight or substantial stretching depending upon the particular fiber and use contemplated for about 0.05 to 30 minutes, preferably about 0.1 to 10 minutes at about 200° to 550° F., preferably about 250° to 480° F., principally to at least partially thermoset the resin, drive off volatile materials and, if necessary, stretch the fiber under applied tension.

The resulting dried coated fibrous materials, such as tire cords, are then dipped or treated with a brominated butyl rubber-containing cement having, per 100 parts by weight of brominated butyl rubber, about 5 to 150, advantageously about 10 to 120, and preferably about 15 to 90 parts by weight, of a filler such as silica, clays, alumina, diatomaceous earth, calcium carbonate, silica-alumina, and preferably carbon black with or without the addition of conventional curatives such as sulfur, zinc oxide, derivatives of thiuram or carbamic acid, quinoid compounds, primary or polyfunctional amines, phenol-dialcohol resins of the polymethylol phenol type, benzothiazyl disulfide, mercaptobenzothiazole, mercaptoimidazoline, sulfenamides, or the like. The cement generally contains about 5 to 25 weight percent, preferably about 10 to 20 weight percent solids, in a $C_5$ to $C_{10}$ hydrocarbon such as pentane, hexane, isooctane, cyclohexane, methyl cyclohexane, benzene, toluene, naphthas, mineral spirits, etc. or a halogenated hydrocarbon such as ethylene dichloride, chloroform, carbon tetrachloride, or the like.

The treated fibrous material is then dried to remove the rubber solvent at about 150° to 300° F., preferably about 200° to 250° F. for about 0.5 to 30 minutes, preferably about 1 to 10 minutes, preferably under conditions of extended storage. However, air drying at room temperature will suffice. The dried treated fibrous materials such as tire cords are then imbedded as by calendering or the like in an unvulcanized rubber matrix such as natural rubber, butyl rubber, chlorinated butyl rubber, brominated butyl rubber, neoprene rubber, GR-S rubber, Buna-N rubber, rubbery vinyl pyridine-butadiene copolymers, rubbery tripolymers of butadiene-acrylonitrile-vinyl pyridine, etc. and vulcanized in situ for about 0.5 to 90 minutes at about 200° to 450° F. to produce a finished article having an improved bond between the coated fibrous material and rubber.

The above procedure produces superior articles suitable for use in constructing tire carcasses for automobiles, trucks, airplanes, etc., as well as numerous other uses such as conveyor belts, rubber hosing, air springs and other products built up of a plurality of laminations of cord and rubber, etc., the invention being especially applicable to such products which have at least one layer which is of butyl rubber. The invention may also be applied in uses involving merely a single layer of a fabric such as nylon, cotton, rayon, silk, etc., which may be either coated on one side or both sides, with the resin-containing natural rubber latex and brominated butyl rubber cements as described above.

The natural rubber latex used may be obtained as "normal latex," centrifuge-concentrated natural latex, creamed-concentrated natural latex, evaporation-concentrated natural latex, electrodecantation-concentrated natural latex or any other form of natural rubber latex commercially available and known in the art as Hevea latex such as *Hevea brasiliensis* latex. The natural rubber latex used in the examples given hereinafter is a heat concentrated natural rubber latex which has been concentrated after the addition of soap and caustic according to the Revertex process as described in British Patent No. 243,016 known as "Revertex" and containing 72 weight percent solids and having a dry rubber content of 67%, a specific gravity of 0.97 and a density of 8.1 pounds per gallon.

The phenolic-aldehyde resins which are within the purview of the present invention may be generally defined as belonging to the class of heat-hardening phenol-aldehyde type resins, preferably resins from phenolic compounds which, prior to heat-hardening or thermosetting are water soluble at least to the extent of 5 to 10% or more. Such resins are capable of thermally setting in the absence of any added catalysts at temperatures of about 150° to 400° F., temperatures of 200° to 250° F. being preferred for coating rayon whereas higher temperatures are permissible for nylon.

As phenolic compounds capable of producing resins of the above-mentioned characteristics, mono- or especially polyhydroxy benzenes are satisfactory. Di-hydroxy benzenes having the hydroxyl groups meta with respect to each other are preferred. Satisfactory phenolic compounds include phenol, cresols, orcinol, phloroglucinol, xylenols, trimethyl phenols, mono- or dichloro phenols, diamyl or diisopropyl phenols, p-tertiary butyl phenol, p-phenyl-phenol, hydroquinone, and especially resorcinol.

The preferred aldehydes for reaction with the above phenolic compounds include formaldehyde or a material supplying formaldehyde such as paraformaldehyde. Other suitable aldehydes include acetaldehyde, propionaldehyde, furfural, etc. The ratio of the phenolic compound to the aldehyde is preferably such that the resin, prior to thermosetting, has substantial water solubility. In order to produce the desired resin, a small amount of an alkali metal containing catalyst or other condensing agent is preferred. If sodium hydroxide is employed, it is advantageously present in amounts of about 0.02 to 0.5 percent by weight, based on reactants.

The brominated butyl rubber is produced by reacting the unvulcanized rubber per se or dissolved in a solvent with bromine or bromine-liberating compounds so that the polymer contains at least 0.4 weight percent and preferably at least 0.5 weight percent of combined bromine but not more than about 3 atoms of bromine combined in the polymer per molecule of multiolefin present therein; i.e. not more than about 3 atoms of combined bromine per double bond in the polymer. In the appended claims the expression "brominated butyl rubber" has this meaning.

Suitable brominating agents which may be employed are molecular bromine, alkali metal bromites (preferably sodium hypobromite), sulfur bromides (particularly oxygenated sulfur bromines), pyridinium bromide perbromide, N-bromo-succinimide, N,N'-dibromo dimethyl hydantoin, alpha-bromoaceto acetanilide, tri-bromophenol bromide, N-bromoacetamide, beta-bromo-methyl phthalimide, and other common brominating agents. The preferred brominating agents are molecular bromine and/or those bromine compounds which are known to lead to allylic substitution, e.g. N,N'-dibromo dimethyl hydantoin, N-bromosuccinimide, beta-bromoethyl phthalimide, N-bromoacetamide, etc. The bromination is advantageously conducted at about −30° C. to +200° C., preferably at about 20° to 170° C., for about one minute to several hours. However, the temperatures and times are regulated to brominate the rubbery copolymer to the extent above-mentioned.

The bromination may be accomplished in various ways. One process comprises preparing a solution of the copolymer as above, in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, chlorobenzene, chloroform, trichloroethane, carbon tetrachloride, etc., and adding thereto the bromine or other brominating agent, optionally in solution, such as dissolved in an alkyl chloride, carbon tetrachloride, etc. Another variation comprises employing liquid bromine. Still a further method resides in blending with the solid copolymer a solid brominating agent which is known to lead to allylic substitution such as N,N'-dimethyl dibromo hydantoin or N-bromosuccinimide, supra. In such a case, the blend formed is preferably mill-mixed and heated to a temperature sufficient to brominate the solid copolymer. The use of elevated or depressed pressures is optional since atmospheric pressure is satisfactory. However the pressure may vary, depending upon the foregoing temperatures and reaction times from about 1 to 400 p.s.i.a.

The invention will be better understood from the following experimental data.

EXAMPLE I

Nylon tire cords (type T–300) were dipped at room temperature in a resin-containing natural rubber latex of the following formulation.

| Component: | Parts by weight |
| --- | --- |
| Revertex latex solids | 15 |
| Resorcinol | 1.1 |
| Formaldehyde (37%) | 1.9 |
| Water | 82 |

The solution containing resorcinol and formaldehyde in water was aged for six hours at room temperature (75° F.) after adjustment of the pH to 9.5 with 10% caustic solution and then blended with the latex at which time the pH rose to 10.2. The nylon cord, after dipping in the above formulation, was then dried at 250° F. for 5 minutes. This treated cord was then dipped at room temperature into a brominated butyl rubber-containing cement having 15 weight percent solids wherein the brominated butyl rubber had a viscosity average molecular weight of 360,000, a mole percent unsaturation of 0.6, a Mooney viscosity (8 minutes at 212° F.) of 53, and 2.45 weight percent combined bromine. For comparison purposes, a portion of the resin-containing natural rubber latex treated cord was dipped in an unmodified butyl rubber cement having 15 weight percent solids, wherein the unmodified butyl rubber had a viscosity average molecular weight of 496,000, a Mooney viscosity (8 minutes at 212° F.) of 71 and a mole percent unsaturation of 1.4. In each run, the solids portion of the cement had the following composition in the preparation of which the compounded stock had been milled on a rubber mill at room temperature for 15 minutes.

| Component: | Parts by weight |
| --- | --- |
| Polymer | 100 |
| Carbon black (MPC) | 50 |
| Zinc oxide | 5.0 |
| p-Octyl phenol-formaldehyde heat reactive resin containing 6% methylol groups (Amberol ST-137) | 8.0 |

The cords, double coated as above, were then each dried for 2 minutes at 250° F. The cords were then lodged in an uncured butyl rubber matrix and vulcanized for 25 minutes at 320° F.; the matrix having the following composition.

| Ingredient: | Parts by weight |
|---|---|
| Butyl rubber [1] | 100 |
| MPC carbon black | 24 |
| SRF carbon black | 16 |
| N-nitroso-p-nitroso methyl aniline | 1.0 |
| Zinc oxide | 5.0 |
| Amberol ST-137X [2] | 2.5 |
| Sulfur | 2.0 |
| Tellurium diethyl dithiocarbamate | 1.25 |
| Plasticizer hydrocarbon oil "A" [3] | 12.5 |

[1] The butyl rubber of the matrix had a viscosity average molecular weight of 336,000, a mole percent unsaturation of 1.99, and a Mooney viscosity (212° F. for 8 minutes) of 45.
[2] Non-reactive p-octyl phenol-formaldehyde resin.
[3] The plasticizer hydrocarbon oil was a paraffinic base oil having the following characteristics:

| | |
|---|---|
| Aniline point (° F.) | 215 |
| S.S.U. at 100° F. | 508 |
| S.S.U. at 210° F. | 58 |
| Pour point (° F.) | 30 |
| Flash point (° F.) | 365 |
| Specific gravity | 0.90 |

The adhesions of the cords, coated in accordance with the invention, to the matrix were measured by a technique essentially similar to the "H" test described by Lyons, Conrad and Nelson, Rubber Chemistry and Technology, 268, vol. XX (1947). The tire cords used were nylon tire cords of 840 denier/2 ply construction. The test specimens were prepared with a ⅜ inch length of treated cord vulcanized into the center of a 1½ x ⅜ x ⅛ inch butyl rubber matrix composition. The vulcanized rubber matrix was reinforced with light cotton duck on the two long sides from which the cord did not protrude. The force required to pull the ⅜ inch length of cord from the rubber block was measured by means of a Scott tensile tester at a 10 inches per minute jaw separation rate at 75° F. The results were as follows:

"H" Test Adhesion Results

[Adhesion in pounds at room temperature]

| | |
|---|---|
| Brominated butyl cement | 16.5 |
| Unmodified butyl cement | 8.8 |

The above data indicates that superior adhesion is obtained when employing the brominated butyl rubber cement in conjunction with a resorcinol-formaldehyde resin-containing natural rubber latex in accordance with the present invention.

EXAMPLE II

Nylon tire cord of 840 denier/2 ply construction (T-300) was treated with a resin containing natural rubber latex dip as in Example I and dried as described in Example I. The brominated butyl rubber, the same as that described in Example I, was compounded on a cool 12 inch laboratory mill to prepare the compositions shown below. Cements were prepared by adding 15 g. of each to 85 g. of hexane and agitating on a mechanical shaker for 16 hours. Nylon cord lengths, treated and dried as described above with a natural rubber latex composition, were dipped in one of the cements and dried for 2 minutes at 250° F. Adhesion test specimens were prepared using the rubber matrix formulation and vulcanization procedure of Example I. The forces required to dislodge the ⅜ inch lengths of imbedded cord as measured by a Scott tensile tester were as follows:

| Cement Compound Composition (Parts by Weight) | | | | "H" Test Adhesion (Pounds) |
|---|---|---|---|---|
| Brominated Butyl Rubber | Carbon Black (MPC) | Zinc Oxide | Amberol ST-137 | |
| 100 | | | | 11.0 |
| 100 | 50 | | | 18.1 |
| 100 | 50 | 5 | | 15.4 |
| 100 | 50 | 5 | 8 | 16.0 |

The above data show that good adhesion is not dependent on the presence of resin (Amberol ST-137) or zinc oxide but that a filler such as a carbon black is an essential component.

EXAMPLE III

Nylon tire cord was treated with a resin-natural rubber latex dip and dried as in Examples I and II. The brominated butyl rubber of Example I was compounded on a laboratory mill with varying amounts of filler, as indicated below, and cements prepared in hexane at 15% solids as described in Example II. The latex treated cord was dipped in one of the following cements, dried and adhesion samples prepared and tested as in Examples I and II with the following results:

| Cement Compound Formulation (Parts by Weight) | | "H" Test Adhesion (Lbs. at 75° F.) |
|---|---|---|
| Brominated Butyl Rubber | Carbon Black (MPC) | |
| 100 | 70 | 18.0 |
| 100 | 50 | 18.5 |
| 100 | 25 | 18.6 |
| 100 | 10 | 17.2 |
| 100 | 0 | 11.0 |

The above data show that, with as little as 10 parts per hundred of brominated butyl rubber of a reinforcing filler (e.g. carbon black) present in the cement composition, excellent adhesion between the butyl rubber matrix and nylon cord is realized. The data further show that increasing the amount of added filler up to 70 parts per hundred of brominated butyl rubber gives about the same adhesion as when using only 10 parts of added filler. This indicates that the amount of filler may be varied over a broad range and yet result in the improvements of the present invention.

EXAMPLE IV

Nylon tire cord was given a first treatment with a natural rubber latex-resin system as described in previous examples. A portion of this coated and dried cord was then dipped in one of the following 15% solids in hexane cements wherein the bromine content of the polymer compound with 50 p.h.r. of carbon black (MPC) was varied. After application of the cement coating, the cords were dried for 2 minutes at 250° F. and "H" test samples prepared and tested as in Example I. The adhesion values, obtained between nylon cord and the butyl rubber matrix of Example I using this double coated cord, wherein the bromine content of the modified butyl rubber in the cement layer varied from 0.17% to 2.45%, are shown in the following table.

| Brominated Butyl Rubber Employed | | | "H" Test Adhesion (Lbs. at 75° F.) |
|---|---|---|---|
| Bromine Content | Iodine No.[a] | Intrinsic Viscosity [b] | |
| 0.17% | 9.7 | 1.58 | 10.7 |
| 0.43% | 8.3 | 1.49 | 15.4 |
| 1.38% | 7.4 | 1.74 | 18.2 |
| 2.45% | 4.1 | 1.11 | 18.9 |

[a] Drastic Iodine Mercuric Acetate Method—Gallo & Weise, Industrial and Engineering Chemistry, vol. 40, 1277 (1948).
[b] Intrinsic viscosity in diisobutylene at 25° C.

The above data indicate that a reduction of the bromine content below about 0.4% will result in a less efficient bonding system.

EXAMPLE V

Using the brominated butyl rubber of Example I containing 2.45% bromine, a cement was prepared at 15% solids in hexane from a cement compound which was prepared on a cool laboratory mill in the formulation: polymer—100 parts and carbon black (MPC)—50 p.h.r. This cement was applied to nylon tire cord dipped in one of the latex formulations described in the following table, dried for 5 minutes at 250° F. and "H" test adhesion specimens prepared as described in Example I after drying the cement coating by placing the double coated cord in an air oven for 2 minutes at 250° F.

The latex dips were prepared by dissolving the formaldehyde and resorcinol in the dip make-up water and slowly adding this resorcinol-formaldehyde solution to the natural rubber latex with gentle agitation. The pH of the newly completed dip was then adjusted from about 7.8 to about 8.3 by the addition of a minor concentration of a 10% sodium hydroxide solution. The resin was allowed to partially form by aging this composition for 16 hours at 57° F. prior to treating the nylon tire cord. The adhesion results, obtained over a wide concentration range of resin-forming constituents in the natural rubber latex dip, are shown in the following table.

| Latex Formula | Parts By Weight (Unless Otherwise Indicated) | | | |
| --- | --- | --- | --- | --- |
|  | A | B | C | D |
| Percent of Added Resin Reactants Based on Latex Solids | 24.1% | 12.0% | 5.9% | 2.9% |
| Natural Rubber Latex Solids | 15.0 | 15.0 | 15.0 | 15.0 |
| Resorcinol | 2.2 | 1.1 | 0.55 | 0.27 |
| Formaldehyde, 37% | 3.8 | 1.9 | 0.9 | 0.45 |
| Water | 79.0 | 82.0 | 83.6 | 84.3 |
| (pH Adjusted to 8.3—Dips Aged for 16 Hours before Treating Nylon Cord; "H" Test Adhesion to Butyl Rubber Matrix—Double Coated Cord; lbs. @ 75° F.) | 19.7 | 20.1 | 20.4 | 14.9 |

The above data indicate that good adhesion to nylon tire cord is obtained over the range of resin reactant contents from 2.9 to 24% based on rubber solids in the latex dip. The optimum range of resin contents, based on rubber solids, is between 5 and 25% of resin reactants based on latex rubber solids.

EXAMPLE VI

Using latex formula B of Example V, but differing only in stabilization with ammonia, for the preliminary coat of rayon tire cord, 1650 denier/2 ply construction, followed by a treatment with the 15% brominated butyl rubber cement of Example V. an "H" test adhesion value of 24.2 pounds was obtained at 75° F. In this experiment after 16 hours aging, the pH of the dip was increased to 10 by the addition of a minor concentration of 28.7% ammonia. This dip shelf aged at 75° F. for 96 hours prior to treating the rayon cord. The latex treated rayon was dried for 5 minutes at 250° F., cement treated, redried for 2 minutes at 250° F. and "H" test adhesion samples prepared as described in Example I. The "H" test adhesion value of 24.2 pounds obtained is in excess of known commercial requirements.

One particularly advantageous use for the adhesion combinations of the present invention is pneumatic tires of either the inner tube containing variety or in tubeless type tires.

Referring now to the drawings, FIGURE 1 depicts a pneumatic tubeless tire which comprises a hollow toroidal type member which is substantially U-shaped in cross-section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air-sealing means to aid in adhesion to rim 12 when the tire is inflated. Typical air sealing means may comprise a layer of rubber disposed on the outer surfaces of the bead portions. This layer will generally vary in thickness between about 0.02 to 0.5 inch and comprise a vulcanized rubber or rubbers having a relatively low compression or permanent set. Alternatively, the outer surfaces of the bead portions may contain a plurality of ribs or, if these surfaces are smooth, the tire rim may be roughened (for example by sand-blasting) and/or ribbed circumferentially or both circumferentially and radially in those areas where the outer surfaces of the tire bead portions contact the rim.

In any of the foregoing types of sealing means, a gumbo, dope, or cement comprising a soft, tacky, rubbery composition may be applied to the outer surfaces of the bead portions and/or the tire rim prior to mounting the tire. The particular structural details of the tire or rim surfaces do not constitute a part of the present invention. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to conventional fabrication, but in general the tire is a multi-layered type of structure with an outer layer as above-mentioned. The layer next adjacent the outer layer generally comprises a carcass 15 which includes a rubber which has incorporated therein a fabric composed of a plurality of cotton, rayon, steel or nylon cords, etc. in the manner hereinbefore described, in accordance with the present invention. The tire also includes an inner lining 16 and/or a tie-ply advantageously made from rubber, e.g. natural rubber, chlorinated butyl rubber (containing at least 0.5 weight percent combined chlorine but not more than 1 atom of chlorine per double bond in the rubber), brominated butyl rubber, unmodified butyl rubber, or natural rubber, vulcanized for about 1 to 60 minutes at about 200° to 450° F. This inner lining must be substantially impermeable to air. The above multi-layers, at least three in number, are conventionally bonded or otherwise adhered together, for example, by cementing and/or especially by vulcanizing to form a tire of a unitary structure.

Another advantageous use for the adhesion combinations of the present invention is in making air springs. Referring now to FIGURE 2 of the accompanying drawings, there is shown a hollow convoluted cylindrical air spring, the ends of which may be clamped and filled with a fluid such as air under sufficient pressure to render the same useful in place of conventional leaf or coil springs in cars, buses or trucks.

Other embodiments of the present invention comprise the use of the adhesion combinations of the present invention in conveyor belting, transmission belting and steam hose. FIGURE 3 shows a conveyor belt 22 being in position on drive roller 23, idle roller 24, and idle support rollers 25. The belt consists of a rubber containing imbedded therein a fabric 36 composed of a plurality of plies of cotton, rayon, nylon or steel filaments, cords or threads.

FIGURE 4 shows a central longitudinal section broken away of a flexible rubber steam hose 27 produced in accordance with the present invention. Again, as in the case of the conveyor belt, the steam hose consists of a rubber having imbedded therein a cotton, rayon, nylon or steel fabric 28.

The expession "layer" as employed in the claims is intended to include plies and liners, as well as such layers as the carcass, sidewalls, tread area, etc., of tires.

Resort may be had to various modifications and variations of the present invention without departing from

What is claimed is:

1. A process for improving the surface adhesion of a fibrous material which comprises coating said material with a phenolic-aldehyde resin-containing natural rubber latex, drying the coated fibrous material, and then coating it with a brominated butyl rubber cement.

2. A process according to claim 1 in which the phenolic-aldehyde resin is a resorcinol-formaldehyde resin.

3. A process which comprises coating a fibrous material with a phenolic aldehyde resin-containing natural rubber latex, drying the coated material formed, and coating the resulting product with brominated butyl rubber which has been reacted with sufficient amounts of a brominating agent to contain at least about 0.4 weight percent bromine to not more than about 3 atoms of combined bromine per double bond in the butyl rubber polymer and to impart improved adhesive properties thereto.

4. A process according to claim 3 in which the fibrous material is a synthetic rayon tire cord.

5. A process according to claim 3 in which the phenolic-aldehyde resin is a resorcinol-formaldehyde condensation product.

6. A process according to claim 3 in which the fibrous material is nylon.

7. A process according to claim 3 in which the brominated butyl rubber formed has been compounded with about 5 to 150 parts by weight of a powdered filler per 100 parts by weight of brominated butyl rubber.

8. A process according to claim 3 in which the brominated butyl rubber is dissolved in a volatile solvent.

9. A fibrous material coated with a first layer of a resorcinol-formaldehyde resin-containing natural rubber latex and having an outer coating of a cement of brominated butyl rubber.

10. A laminated structure comprising a fibrous material, said fibrous material having a first coating of a dried resorcinol-formaldehyde resin-containing natural rubber latex and having a second coating of a brominated butyl rubber containing at least about 0.5 weight percent bromine but not more than about three combined atoms of bromine per double bond in the polymer, said coated fibrous material being adjacent to at least one layer of rubber adhesively united to said coated fibrous material.

11. A laminated structure according to claim 10 comprising at least two rubber layers and at least one interposed layer of fibrous material.

12. A laminated structure according to claim 10 of a hollow cylindrical form adapted to retain therein a fluid and being suitable for use as an air spring in motor vehicles.

13. A laminated structure according to claim 10 being of a hollow cylindrical form and adaptable for use as a hollow rubber hose suitable for conveying materials there through.

14. A rubber tire which contains in the carcass layer thereof a plurality of cords imbedded in a rubber, said cords having a first coating of a dried phenolic-aldehyde resin-containing natural rubber latex and having a second coating of brominated butyl rubber containing at least 0.4% bromine but not more than about 3 atoms of combined bromine per double bond in the butyl rubber polymer, to improve the adhesion of said cords to the rubber in which they are imbedded.

15. In a tubeless tire the combination which comprises an inner layer of a member selected from the group consisting of natural rubber, butyl rubber, and brominated butyl rubber; an outer layer including an open-bellied body comprising two opposing side walls, spaced bead portions and a median tread area; and an intermediate layer defining a carcass including a rubber and a plurality of cords imbedded therein, wherein said cords having a first coating of a dried phenolic-aldehyde resin-containing natural rubber latex and having a second coating of brominated butyl rubber to improve the adhesion of said cords to the rubber in which they are imbedded.

16. A tire in accordance with claim 15 in which the rubber in the carcass is selected from the group consisting of natural rubber, rubbery isoolefin-multiolefin copolymers, chlorinated rubbery isoolefin-multiolefin copolymers, brominated rubbery isoolefin-multiolefin copolymers, polychloro-butadiene rubber, rubbery diene-styrene copolymers, rubbery diene-nitrile copolymers, rubbery vinyl pyridine-butadiene copolymers and rubbery tripolymers of butadiene, acrylonitrile and vinyl pyridine.

17. Process for making improved laminated articles comprising at least one layer of nylon fibrous material imbedded in butyl rubber, which comprises first coating said fibrous material with a natural rubber latex containing a resorcinol formaldehyde resin, drying the resulting coated fibrous material, and then coating said fibrous material with a cement of brominated butyl rubber which contains from 0.4 to about 2.45% by weight of combined bromine, dissolved in a volatile solvent, and said cement containing about 10 to 50 parts of carbon black per hundred parts of brominated butyl rubber, drying the resulting coated fibrous material, and imbedding it in a vulcanizable rubber composition in which the rubber consists of butyl rubber, and containing curatives and heating the resulting laminated product to vulcanize the assembly.

18. A fibrous material having a first coating of phenolic-aldehyde resin-containing natural rubber latex and a second coating of brominated butyl rubber.

19. A laminated structure comprising at least one layer of nylon fibrous material imbedded in a vulcanized rubber composition in which the rubber consists of butyl rubber, and containing curatives, said fibrous material having thereon a first coating of a dried resorcinol-formaldehyde resin-containing natural rubber latex and having a second coating thereon of brominated butyl rubber which contains from 0.4 to 2.45% by wt. of combined bromine, and said brominated butyl rubber having admixed therewith about 10 to 50 parts of carbon black per 100 parts of brominated butyl rubber.

References Cited in the file of this patent

UNITED STATES PATENTS

| | | |
|---|---|---|
| 2,128,229 | Charch et al. | Aug. 30, 1938 |
| 2,615,826 | Mallory | Oct. 28, 1952 |
| 2,631,984 | Crawford et al. | Mar. 17, 1953 |
| 2,652,353 | Wilson | Sept. 15, 1953 |
| 2,720,479 | Crawford et al. | July 9, 1955 |
| 2,775,537 | Wilson et al. | Dec. 25, 1956 |
| 2,798,526 | Peterson et al. | July 9, 1957 |
| 2,821,232 | Wolf | Jan. 28, 1958 |
| 2,822,311 | Rowe et al. | Feb. 4, 1958 |